US007562589B2

(12) United States Patent
Anjanappa et al.

(10) Patent No.: US 7,562,589 B2
(45) Date of Patent: Jul. 21, 2009

(54) DISPLAY DEVICE FOR AN ELECTRONIC TORQUE WRENCH

(75) Inventors: Muniswamappa Anjanappa, Ellicott City, MD (US); Awad Aly Gharib, Cockeysville, MD (US); Xia Chen, Columbia, MD (US); Steve Booher, Woodstock, GA (US); Bruce Dexter, South Windsor, CT (US)

(73) Assignee: Easco Hand Tools, Inc., Simsbury, CT (US)

( * ) Notice: Subject to any disclaimer, the term of this patent is extended or adjusted under 35 U.S.C. 154(b) by 3 days.

(21) Appl. No.: 11/487,252

(22) Filed: Jul. 14, 2006

(65) Prior Publication Data

US 2007/0119269 A1 May 31, 2007

Related U.S. Application Data

(60) Provisional application No. 60/700,067, filed on Jul. 18, 2005.

(51) Int. Cl.
*G01D 1/00* (2006.01)
*G01L 5/24* (2006.01)
*B25B 23/14* (2006.01)
*B25B 23/151* (2006.01)
*B25B 23/144* (2006.01)

(52) U.S. Cl. .................. 73/862.23; 73/862.21; 81/467; 81/469; 81/479

(58) Field of Classification Search . 73/862.22–862.23, 73/862.331–862.335; 81/467, 469, 479, 81/478–483
See application file for complete search history.

(56) References Cited

U.S. PATENT DOCUMENTS

2005/0223856 A1 10/2005 Reynertson et al.

*Primary Examiner*—Lisa M Caputo
*Assistant Examiner*—Jonathan Dunlap
(74) *Attorney, Agent, or Firm*—Nelson Mullins Riley & Scarborough, LLP

(57) ABSTRACT

An electronic torque wrench for engaging a workpiece, the electronic torque wrench including a wrench body and a wrench head disposed on the wrench body, the wrench head being configured to engage the workpiece. A grip handle is disposed on the wrench body opposite the wrench head and a user interface is carried by the wrench body. The user interface includes a digital display with a first readout and a second readout, and an input device for inputting a preset torque value. The first readout displays a peak torque value continuously during operations and the second readout displays an applied torque value continuously during operations.

3 Claims, 7 Drawing Sheets

44b

DISPLAY DEVICE FOR AN ELECTRONIC TORQUE WRENCH

CLAIM OF PRIORITY

This application claims priority to U.S. Provisional Application 60/700,067 filed Jul. 18, 2005.

FIELD OF THE INVENTION

The present invention relates generally to torque application and measurement devices. More particularly, the present invention relates to a display device for an electronic torque wrench.

BACKGROUND OF THE INVENTION

Often, fasteners used to assemble performance critical components are tightened to a specified torque level to introduce a "pretension" in the fastener. As torque is applied to the head of the fastener, beyond a certain level of torque the fastener begins to stretch. This stretch results in the pretension in the fastener which then holds the components together. A popular method of tightening these fasteners is to use a torque wrench. Accurate and reliable torque wrenches help insure the fasteners are tightened to the proper torque specifications.

Torque wrenches vary from simple mechanical types to sophisticated electronic types. Mechanical type torque wrenches are generally less expensive than electronic ones. There are two common types of mechanical torque wrenches, beam and clicker types. With a beam type torque wrench, a beam bends relative to a non-deflecting beam in response to the torque being applied with the wrench. The amount of deflection of the bending beam relative to the non-deflecting beam indicates the amount of torque applied to the fastener. Clicker type torque wrenches work by preloading a snap mechanism with a spring to release at a specified torque, thereby generating a click noise.

Electronic torque wrenches (ETWs) tend to be more expensive than mechanical torque wrenches, and more accurate as well. When applying torque to a fastener with an electronic torque wrench, the torque readings indicated on the display device of the electronic torque wrench are proportional to the pretension in the fastener due to the applied torque. However, the readings also depend on, among other factors, the under head friction between the head of the fastener and the adjacent surface of the component and the friction between the mating threads. Static friction is greater than dynamic friction. Therefore, when torquing operations are initiated, increased amounts of torque may be required to overcome static friction forces and initiate rotation of the fastener. Therefore, it follows that torque is preferably applied to the fastener in a slow and continuous manner to allow friction forces to stabilize, to help insure accuracy and to help prevent over-torquing. As well, it is often desirable for the user to see both the current torque value (torque being applied at that instant) and the peak torque value (maximum torque applied up to the present instant) simultaneously. However, existing torque wrenches typically display only the current torque value or the peak torque value at any given time.

When a torque wrench is operated in a "tracking mode," the current torque value is displayed and the user therefore does not necessarily get immediate feedback regarding the actual peak torque value to which the fastener may have been subjected. Although with some electronic torque wrenches it is possible to get this information by downloading the data, this action is typically not instantaneous and, therefore, the operator does not get immediate feedback. On the other hand, when operating in a "peak hold mode," the display of the electronic torque wrench typically shows only the maximum torque applied to the fastener up to that time. In the peak hold mode, the user is often ignorant of the current torque level, which can lead to either over or under-torquing the fastener.

Another factor that can affect the accuracy of a reading on an electronic torque wrench is the operating temperature. Strain gages that are used in electronic torque wrenches to measure applied torque are often affected by temperature. Therefore, to obtain accurate torque measurements, it is often necessary to measure the existing temperature and adjust the displayed torque value for a given strain gauge reading.

Drawbacks present in prior art electronic torque wrenches may lead to the over or under-torquing of fasteners, which can contribute to reduced performance, and eventual failure, of the fasteners.

The present invention recognizes and addresses the foregoing considerations, and others, of prior art constructions and methods.

SUMMARY OF THE INVENTION

One embodiment of the present invention provides an electronic torque wrench for engaging a workpiece, the electronic torque wrench including a wrench body with a wrench head disposed on the wrench body, wherein the wrench head is configured to engage the workpiece. A grip handle is disposed on the wrench body opposite the wrench head and a user interface is carried by the wrench body. The user interface includes a digital display with a first readout and a second readout, and an input device for inputting a preset torque value. The first readout displays a peak torque value continuously during operations and the second readout displays an applied torque value continuously during operations.

Another embodiment of the present invention provides a method of displaying a peak torque value and an applied torque value as a percentage of a preset torque value on a digital display of an electronic torque wrench during a torquing operation on a workpiece. The method includes the steps of: inputting the preset torque value into the electronic torque wrench, the preset torque value being the maximum torque that is desired to be applied to the workpiece; detecting a current torque being applied to the workpiece; comparing the current torque to an existing peak torque value displayed on the digital display; displaying the current torque on the digital display as the peak torque value when the current torque exceeds the displayed peak torque value; comparing the current torque to the preset torque value to determine a percentage of the preset torque value that the current torque corresponds to; and displaying the percentage on the digital display such that the percentage and the peak torque value are displayed simultaneously at all times during the torquing operation.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
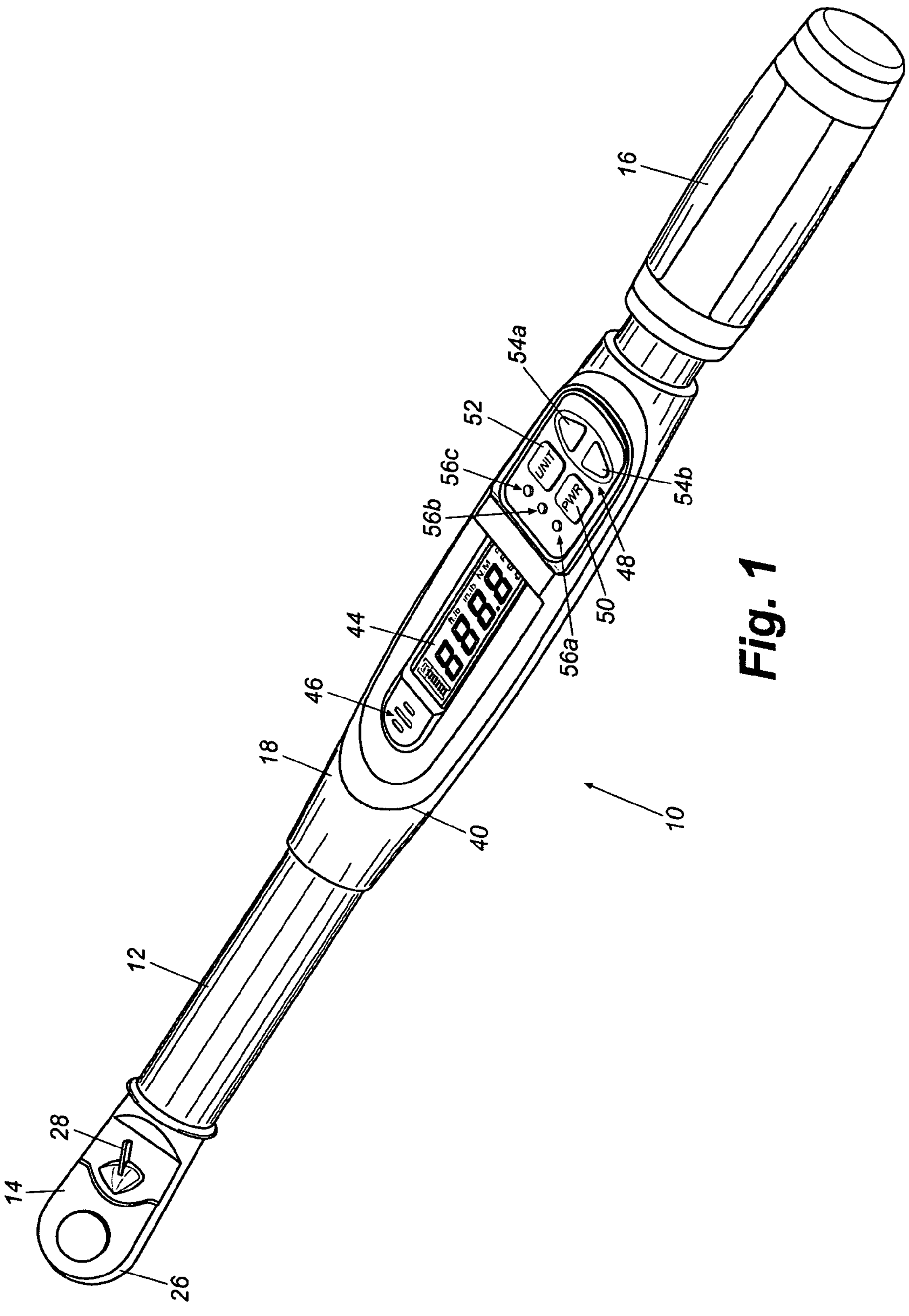
FIG. 1 is a perspective view of a preferred embodiment of an electronic torque wrench in accordance with the present invention.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
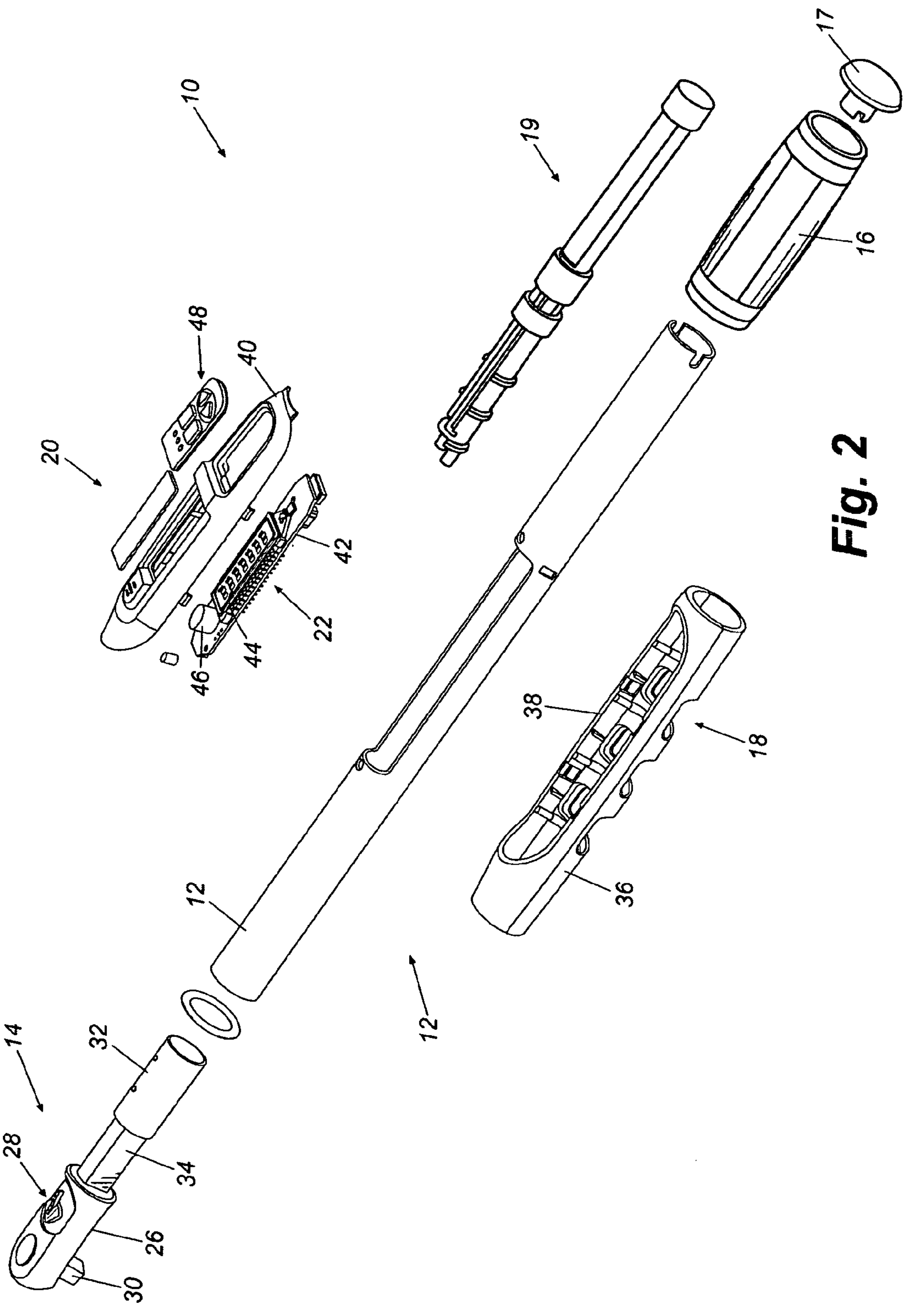
FIG. 2 is an exploded perspective view of the electronic torque wrench as shown in FIG. 1.

Referring now to FIGS. 1 and 2, an electronic torque wrench 10 including a temperature compensated simultaneous tracking and peak hold torque display device in accordance with the present invention is shown. The electronic torque wrench 10 includes a wrench body 12, a ratchet/wrench head 14, a grip handle 16, a housing 18, a battery assembly 19, and an electronics unit 20 with a user interface 22. Preferably, wrench body 12 is of tubular construction, made of steel or other rigid material, and receives wrench head 14 at a first end and battery assembly 19 at a second end, secured therein by an end cap 17. Housing 18 is mounted therebetween and carries electronics unit 20.

As shown, a front end 26 of wrench head 14 includes a ratcheting mechanism with a lever 28 that allows a user to select whether torque is applied to a fastener in either a clockwise or counterclockwise direction. The ratcheting mechanism includes a boss 30 for receiving variously sized sockets, extensions, etc. A rear end 32 of wrench head 14 is slidably received in wrench body 12 and rigidly secured therein. Wrench head 14 includes a flat portion 34 formed between front and rear ends 26 and 32 for receiving a strain gage assembly (not shown). In the preferred embodiment, the strain gage assembly is a full-bridge assembly including four separate strain gages on a single film that is secured to flat portion 34 of wrench head 14. An example of one such full-bridge strain gage assembly is Model No. N2A-S1449-1KB manufactured by Vishay Micromeasurement. Together, the full-bridge strain gage assembly mounted on the flat portion of wrench head 14 is referred to as a strain tensor.

Housing 18 includes a bottom portion 36 that is slidably received about wrench body 14 and defines an aperture 38 for receiving a top portion 40 that carries electronics unit 20. Electronics unit 20 provides a user interface for the operation of the electronic torque wrench. Electronics unit 20 includes a printed circuit board 42 including a digital display 44 and an annunciator 46 mounted thereon. A user input device 48 received in an aperture defined by top portion 40 of the housing. Input device 48 includes a power button 50, a unit selection button 52, increment/decrement buttons 54*a* and 54*b*, and three light emitting diodes (LEDs) 56*a*, 56*b* and 56*c*. Light emitting diodes 56*a*, 56*b* and 56*c* are green, yellow and red, respectively, when activated.

Figure 3:
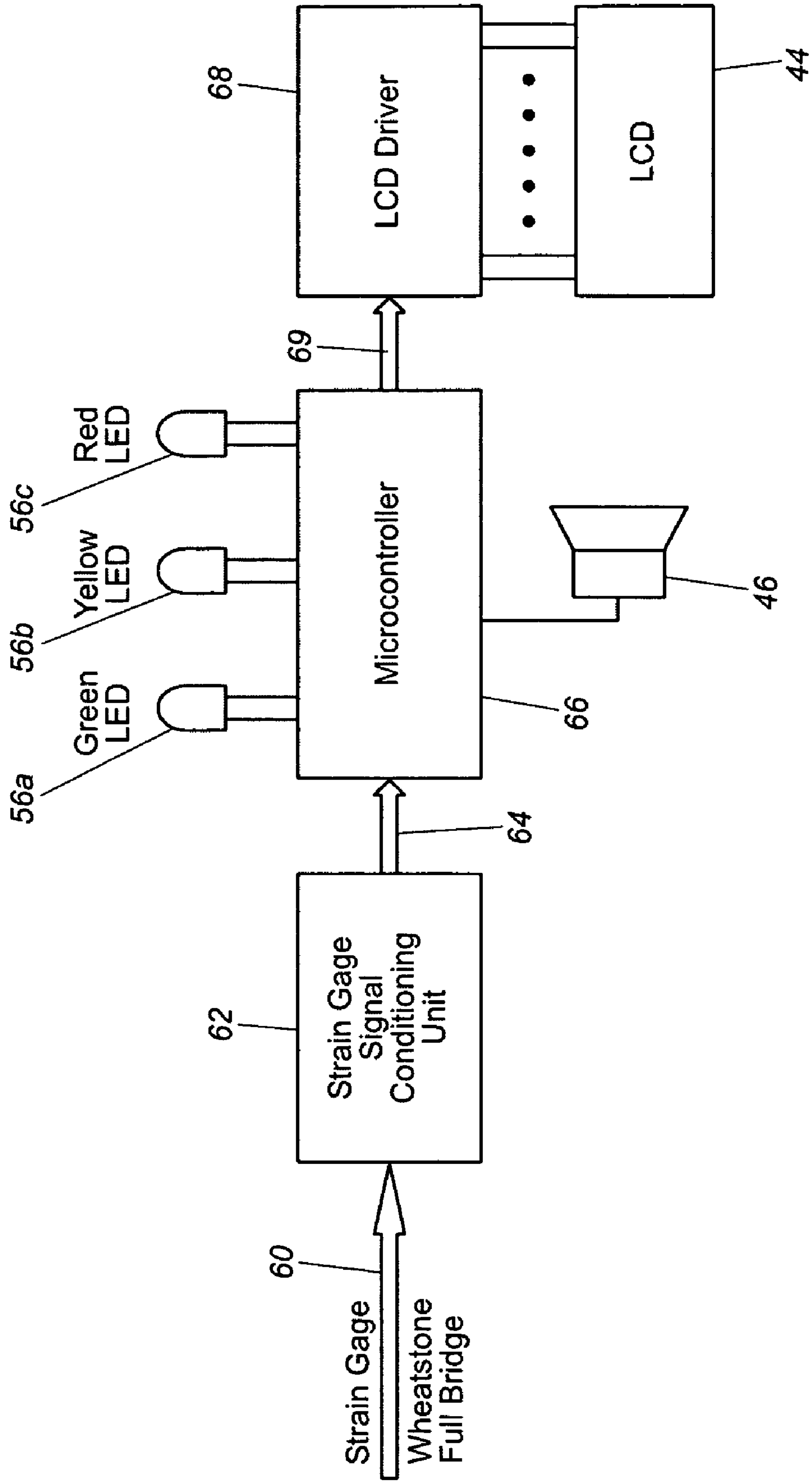
FIG. 3 is a block diagram representation of the electronics of the electronic torque wrench as shown is FIG. 1.
Figure 4A:
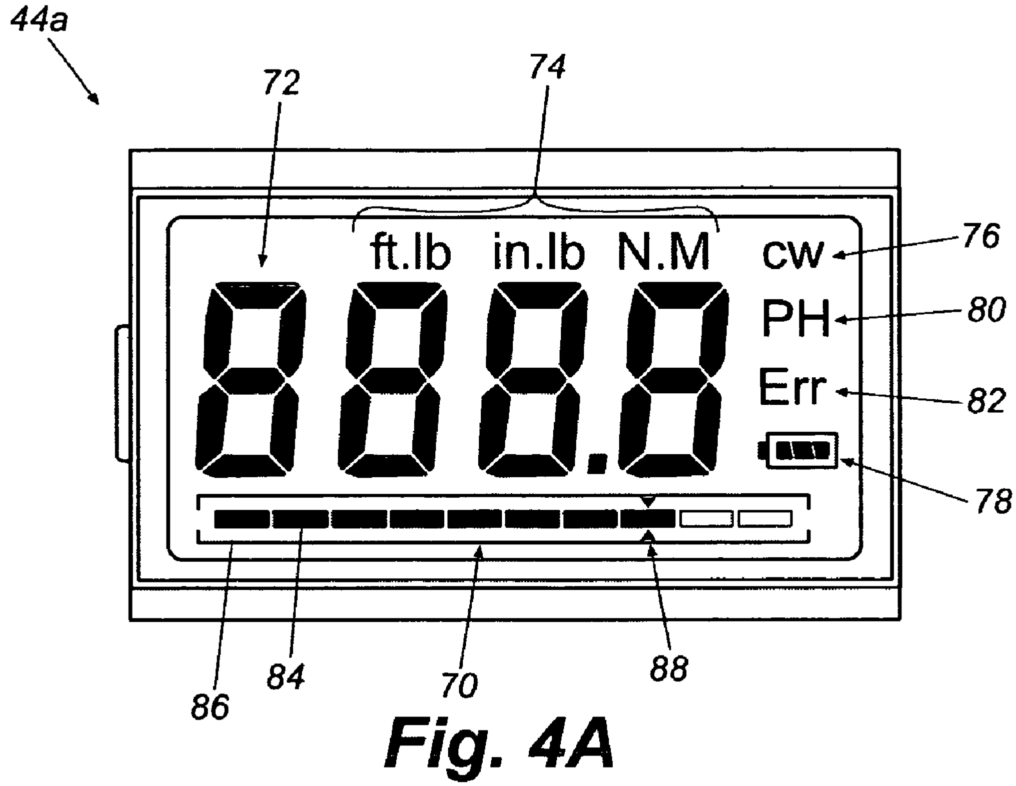
FIGS. 4A and 4B are views of display devices as used with the electronic torque wrench shown in FIG. 1.
Figure 4B:
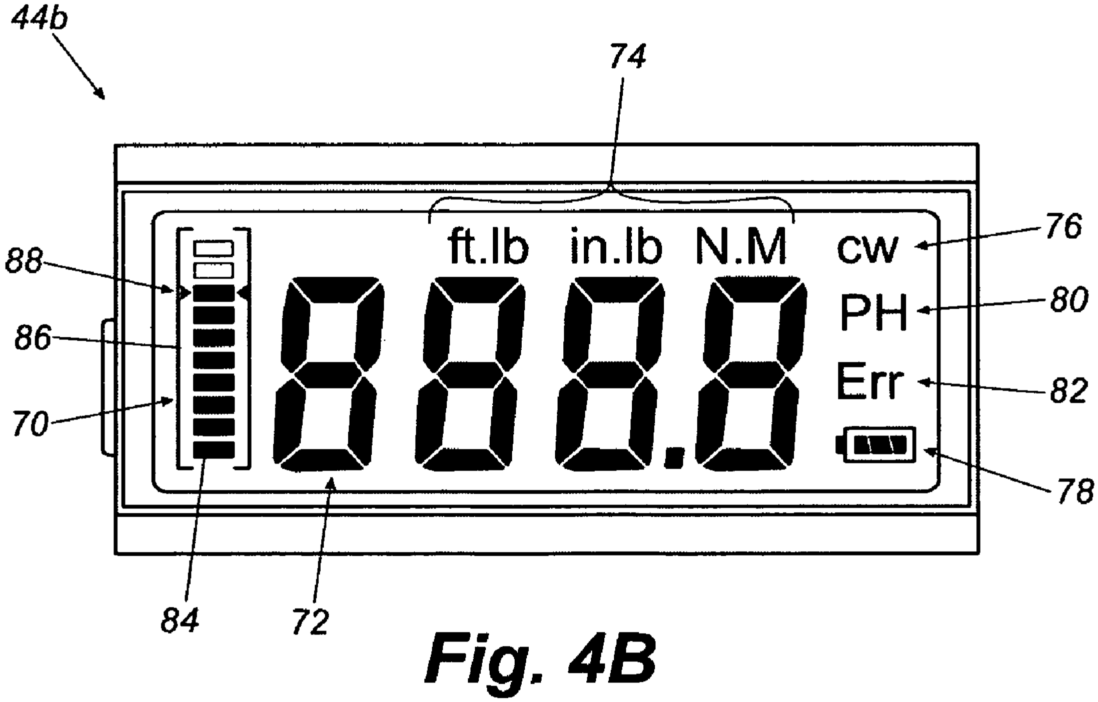

A block diagram representation of the electronics of the preferred embodiment, showing various inputs and outputs, is shown in FIG. 3. When electronic torque wrench 10 is used to apply and measure torque, the strain gages of the strain tensor sense the torque applied to the fastener and send a proportional electrical signal 60 to a strain gage signal conditioning unit 62 that amplifies the signal, adjusts for any offset of the signal, and compensates the signal for the current temperature, as discussed later. Adjusting for the offset of the signal increases the accuracy of the wrench by compensating the signal for any reading that may be present before torque is actually applied to the fastener. An amplified and conditioned electrical signal 64 is then fed to a microcontroller 66 that converts electrical signal 64 to an equivalent torque value in the desired units. Microcontroller 66 sends an electrical signal 69 including the current torque level value and the peak torque value to digital display 44, preferably a liquid crystal display (LCD) unit, via an LCD driver circuit 68. Preferably, digital display 44 displays the current torque level value as a bar graph and simultaneously displays the peak torque value as a numeric value, as seen in FIGS. 4A and 4B. Furthermore, microcontroller 66 generates alarm signals in the form of audio signals and light displays of appropriate color once the current torque level value is within a pre-selected range of the preset limit torque value, as discussed in greater detail hereafter. A red color backlight coincides with the alarm signals to indicate to the user that the preset torque value has been reached. When the red backlight is activated, either flashing or continuous, the user is alerted as to the possibility of over-torquing the fastener.

FIGS. 4A and 4B show detailed views of preferred embodiments of digital displays 44*a* and 44*b*, respectively, of the present invention. The LCD units include a current torque level indicator 70, a four digit numeric display 72, an indication of units selected 74 (foot-pound, inch-pound, and Newton-meter), a torque direction indicator 76 (clockwise (CW) by default and counterclockwise (CCW) if selected), a battery level indicator 78, a peak hold (PH) indicator 80 and an error (Err) indicator 82. As shown, current torque level indicator 70 is in the form of a bar graph. The bar graph is shown in two embodiments, horizontal 44*a* (FIG. 4A) and vertical 44*b* (FIG. 4B). In either case, preferably, the bar graph includes a total of ten segments 84 and a frame 86 that encompasses all ten segments 84. Frame 86 is filled by the ten segments when the preset torque value input by the user is reached. At other times, frame 86 is only partially filled with segments 84, and therefore gives a graphical display of approximately how much torque is currently being applied and how much more torque needs to be applied to the fastener to reach the preset torque valve.

As shown, two small arrows 88 are located on opposing sides of the eighth segment. Arrows 88 are graphical indicators to the user that the current torque level is above 75% of the preset torque value. Each segment 84 within frame 86 represents 10% of the preset torque value, starting from the left or bottom of each bar graph, respectively. For example, if only the first two of segments 84 are displayed, the current torque level is above 15% and below 24% of the preset torque value, and is therefore approximately 20% of the preset torque value. Simultaneously, digital display 44 also displays the peak torque value applied up until that time in numeric display 22. As such, if torque has been applied in a continuously increasing manner, the peak torque value displayed will actually be the same as the current torque value. The decimal point will be displayed depending on which units the user has selected.

In use, the user, rather than focusing on four digit numeric display 72, views the bar graph of current torque level indicator 70 until the applied torque level reaches approximately 75% to 80% of the preset torque value, depending on the user's comfort level when approaching the preset torque level. At this point, the user changes focus to numeric display 72 for a precise indication of the current torque being applied as the preset torque value is approached. As discussed, numeric display 72 shows the peak torque value to which the fastener has been subjected. As such, if the user has "backed off" during the application of torque, the value indicated on numeric display 72 will not change until it is exceeded by the current torque value. Display device 44 allows the user to apply torque to the fastener and know both how much torque is currently applied and how much more torque needs to be applied before reaching the target preset torque value.

Figure 7A:
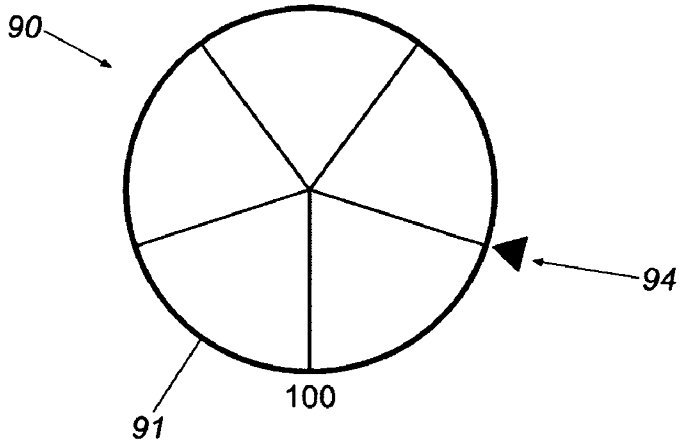
FIGS. 7A through 7C are alternate graphical displays for use with the display devices as shown in FIG. 4A and 4B.
Figure 7B:
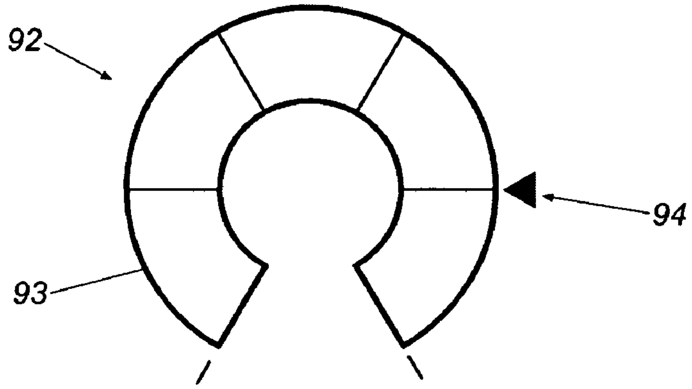
Figure 7C:
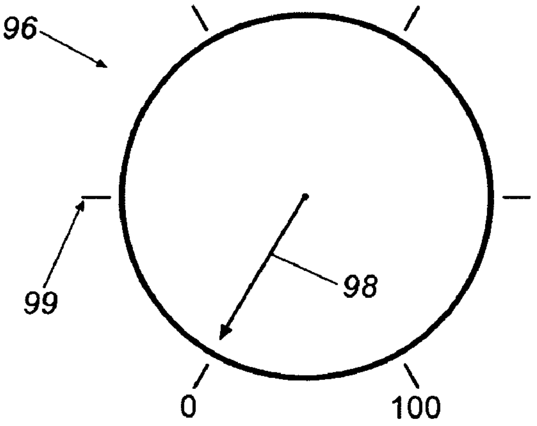

Alternately, the bar graph display can be used for displaying the peak torque value and numeric display 72 can be used to display the current torque value. Alternate embodiments include graphical displays other than the previously discussed bar graph. FIG. 7A shows a pie chart display 90 in which each of five segments 91 represents approximately 20% of the preset torque value initially selected by the user. FIG. 7B shows a circular dial-type display 92 in which each segment 93 also represents approximately 20% of the preset torque value. FIGS. 7A and 7B include an indicator mark 94 at approximately 80% of the preset torque value. FIG. 7C shows a graphical display 96 that is similar in appearance to a standard dial type analog display wherein a pointer 98, or needle, indicates the percentage of the preset torque value being applied as it points to graduations 99 positioned about the display. Note, although the number of segments (FIGS. 7A and 7B) and graduations (FIG. 7C) are shown as representing 20% of the preset torque value, the number may be altered as necessary to indicate a different desired percentage of the preset torque value.

Figure 5:
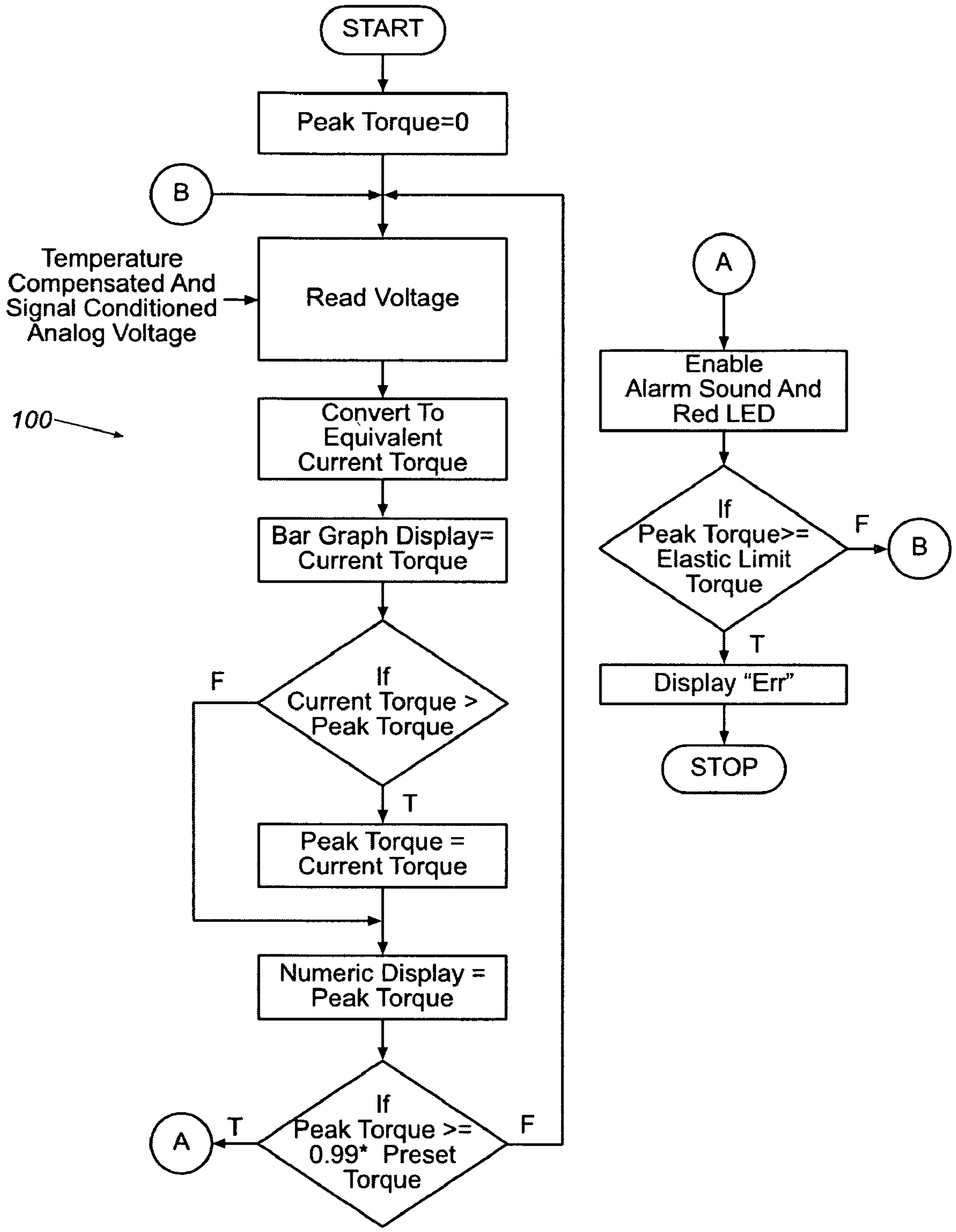
FIG. 5 is a flow chart of the simultaneous display algorithm of the display devices as shown in FIGS. 4A and 4B.
Figure 6:
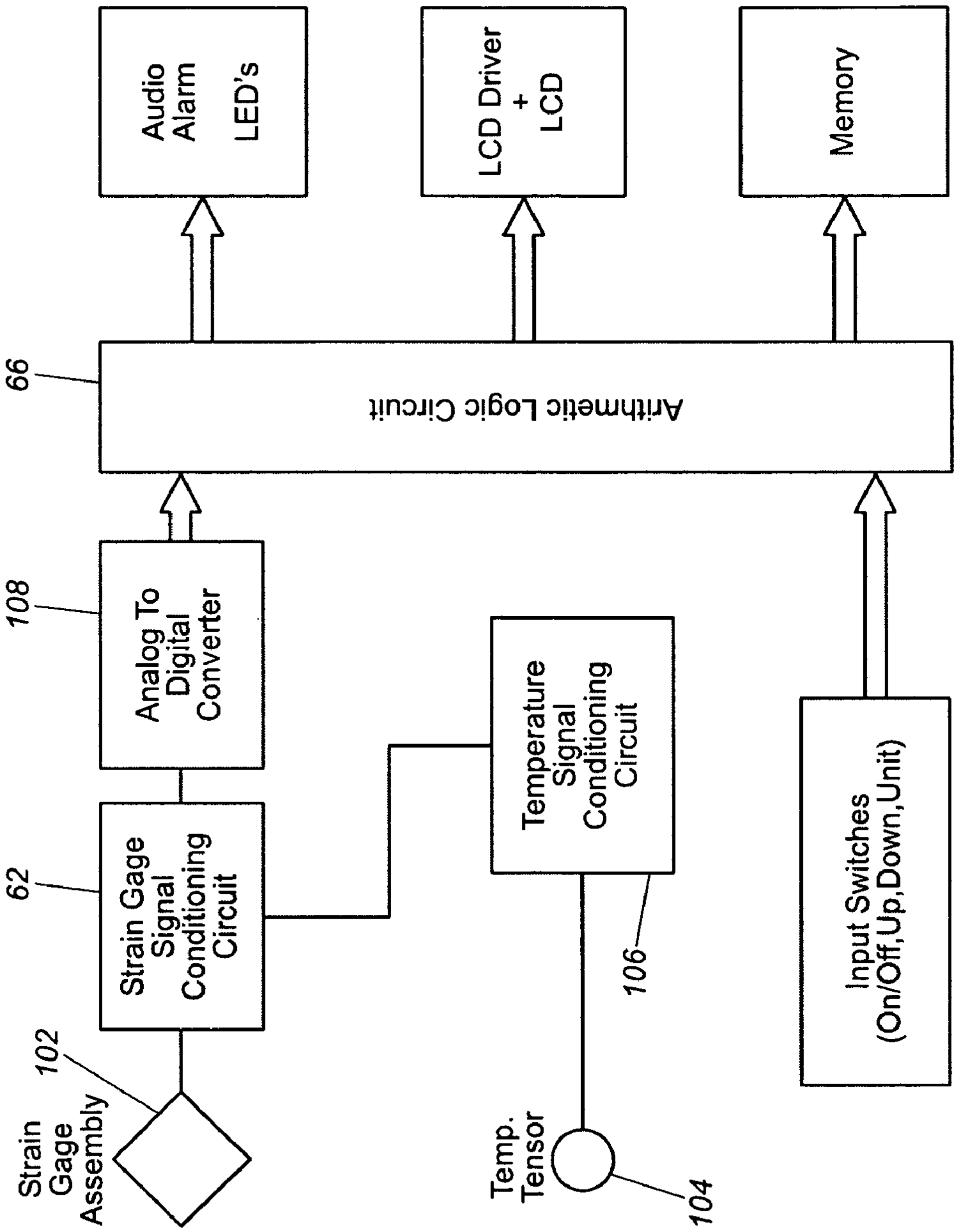
FIG. 6 is a block diagram including the temperature compensation circuit of the display devices as shown in FIGS. 4A and 4B.

Referring now to FIGS. 3 and 5, a flow chart 100 of the algorithm used with the electronics unit is shown. Prior to initiating torquing operations, a user inputs a preset torque value into the electronic torque wrench that equals the maximum desired torque to be applied to the fastener. This value is displayed in numeric display 72 (FIGS. 4A and 4B) until the user actually applies torque to the fastener, at which time the numeric display switches to displaying the peak torque value. As torque is applied, microcontroller 66 (for example, Model No. ADuC843 manufactured by Analog Devices, Inc.) receives and reads a temperature compensated and signal conditioned analog voltage signal 64 (as previously discussed with regard to FIG. 3) from strain gage signal conditioning circuit 62, converts the analog signal to an equivalent digital number, converts the digital number to an equivalent current torque value corresponding to the user selected units, and determines whether the current torque value is a new peak torque value. This is accomplished by comparing the current torque value to the existing peak torque value, and either replacing the peak torque value if it is exceeded (T), or letting it remain if it is not (F). Once both the current torque value and peak torque value are determined, microcontroller 66 sends electrical signal commands 69 to LCD driver circuit 68 (Model No. HT1621 manufactured by Holtek Semiconductors, Inc.) to generate appropriate signals to digital display unit for updating the number of segments 84 shown in current torque level indicator 70 (the bar graph) and the peak torque value shown in numeric display 72.

In addition, microcontroller 66 switches green 56*a*, yellow 56*b*, and red 56*c* LEDs on or off depending on the peak torque value applied to the fastener up until that time. Preferably, green LED 56*a* comes on as long as the peak torque value is below 75% of the preset torque value and is switched off once the peak torque reaches 75% of the preset torque value. Yellow LED 56*b* comes on for peak torque values greater than 75% but less than 99% of the preset torque value. Red LED 56*c* comes on once the peak torque value reaches 99% of the preset torque value and stays on thereafter. The selection of percentage ranges for each color may be programmed, and the percentages at which the LEDs are switched on or off can be changed to suit the specific application. Embodiments are envisioned that include a liquid crystal display device that is capable of displaying multiple colors. This permits the warning LEDs to be replaced by appropriately colored symbols on the LCD. As well, the segments of the bar graphs and graphical displays can be made to have varying colors in order to enhance the warning capabilities for the user.

Once the peak torque reaches the preset torque value, or is within a user selected range, microcontroller 66 generates electrical signals to generate an alarm sound on annunciator 46. A red color backlight (not shown) coincides with the audible alarm signal, indicating that the preset torque value has been reached. More colors, such as yellow and green, can be added as backlights to further assist the user when approaching the preset torque value. The user is also alerted if the mechanically safe torque value (elastic limit of the strain tensor) has been exceeded, possibly causing the torque wrench to lose proper calibration. This is determined by comparing the peak torque value to the elastic limit torque of the torque wrench. If the safe torque value is exceeded (T), an "Err" message is displayed on error indicator 82 and the unit stops, thus indicating that the electronic torque wrench unit needs calibration before it can be used again.

A block diagram of temperature compensation circuit 100 is shown in FIG. 7. As noted, strain gage assembly 102 is a full bridge assembly with four strain gages whose resistance changes as load is applied to a fastener. Full bridge strain gage assembly 102 is electrically connected to strain gage signal conditioning circuit 62 which provides excitation to full bridge strain gage assembly 102 and accepts the low level voltage output of the strain gage assembly. As previously discussed, the low level signal from the strain gage assembly is amplified and any offset is compensated for. A temperature sensor 104 senses the existing temperature and temperature signal conditioning circuit 106 amplifies, quantizes, and then feeds a temperature signal to strain gage signal conditioning circuit 62. Strain gage signal conditioning circuit 62 receives the temperature signal and compensates the strain gage signal to offset the effect of temperature changes.

Without a temperature compensation provision, the strain gage signal would be converted to an equivalent torque value based on a fixed temperature. As noted, strain gage output can be affected by fluctuations in temperature. With the temperature compensation method used in this invention, temperature calibration is done at different temperatures in which the electronic torque wrench may be used, for example, temperatures ranging from negative 20 degrees to positive 65 degrees Celsius. When the effect of temperature on the strain gages is approximated as linear over the range of temperatures, it is sufficient to calibrate at only two temperatures to determine the needed compensation. Although linear compensation is used in the preferred embodiment, temperature signal conditioning circuit 106 may also accommodate nonlinear temperature compensation for a nonlinear relationship between temperature and its effects on strain gage output. For those embodiments, strain gage signal conditioning circuit 62 includes a digital memory where a lookup table of nonlinear calibration data is stored. If nonlinear calibration is chosen, the electronic torque wrench is calibrated over its expected operating temperature range and constants are found for each temperature increment. This data is then stored in the digital memory space available on the signal conditioning circuit, thus allowing for nonlinear temperature calibration. The nonlinear compensation can also be accomplished using a polynomial curve with a finite number of constants rather than using a look up table, and falls within the scope of this invention. The output of strain gage signal conditioning circuit 62 is therefore a temperature compensated and signal conditioned analog voltage that is fed to an analog to digital converter of microcontroller 66.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed is:

1. An electronic torque wrench for engaging a workpiece, comprising:

a wrench body;

a wrench head disposed on said wrench body, said wrench head being configured to engage the workpiece;

a grip handle disposed on said wrench body opposite said wrench head;

a user interface carried by said wrench body, said user interface including a liquid crystal digital display with a first readout and .a second readout, and an input device for inputting a preset torque value, said first readout being a numeric display and said second readout being a bar graph display for indicating the proximity of an applied torque value to a preset torque value and, said bar graph display including:

a bar graph having a predetermined length;

a frame indicating said predetermined length of said bar graph;

a plurality of segments disposed along said frame within said predetermined length, each said segment being operable between a visible state and a non-visible state and indicating an equivalent selected percentage of said preset torque value, each said segment being discernable when in said viewable state from other said segments in said viewable state; and an indicator mark located at a position adjacent said bar graph, said indicator mark indicating when said applied torque value approximately equals a selected percentage of said preset torque value, wherein said first readout displays a peak torque value continuously during operations and said second readout displays an applied torque value continuously during operations.

2. The electronic torque wrench of claim 1, wherein said position of said indicator mark corresponds to said selected percentage of seventy-five percent.

3. The electronic torque wrench of claim 1, wherein said indicator mark depends inwardly from said frame.

* * * * *